Dec. 5, 1961 H. DLUTZIK 3,011,403
VARIFOCAL TELESCOPE LENS SYSTEM
Filed Nov. 16, 1959 2 Sheets-Sheet 1

INVENTOR
Heinz Dlutzik
BY *Albert F. Kronman*
ATTORNEY

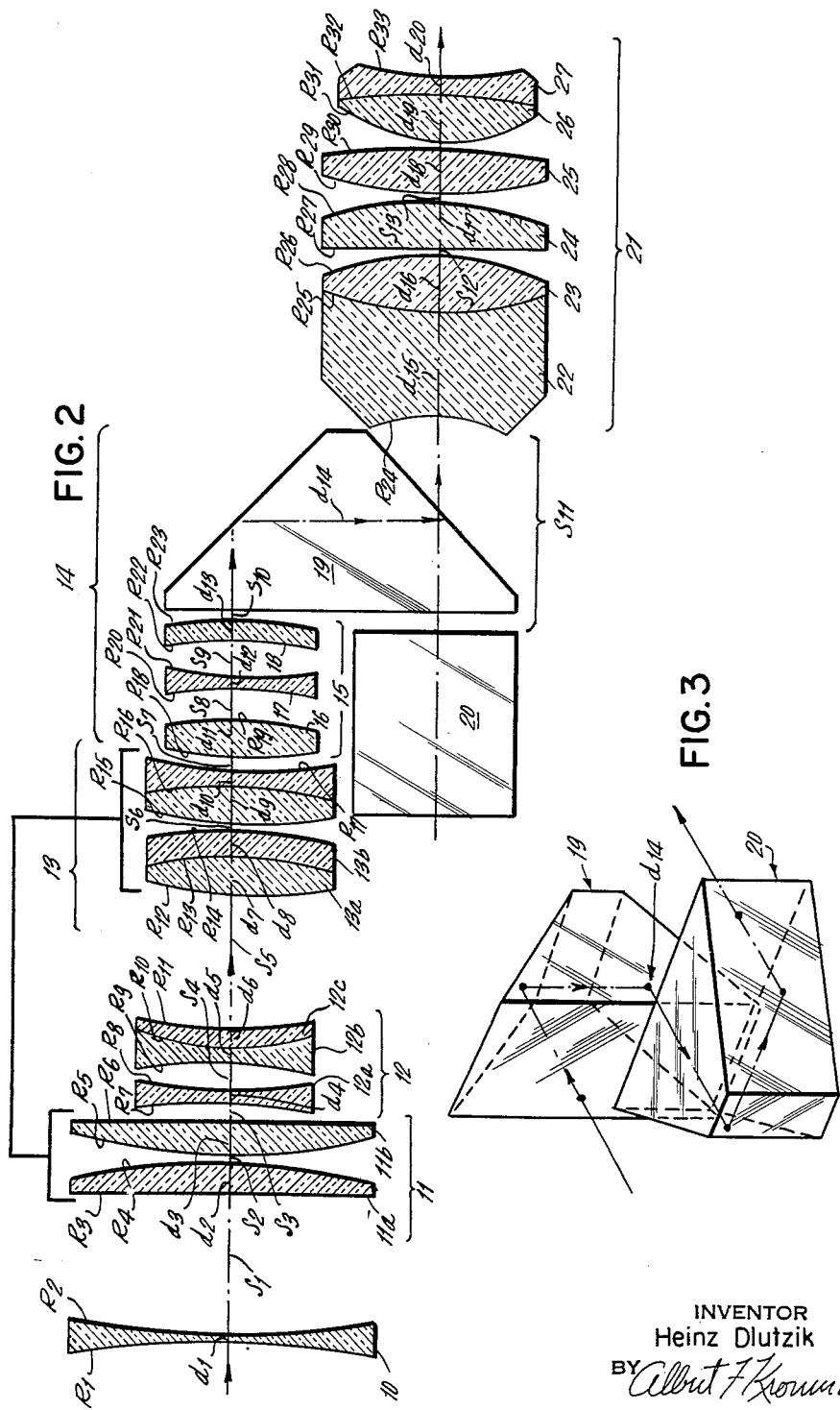

United States Patent Office 3,011,403
Patented Dec. 5, 1961

3,011,403
VARIFOCAL TELESCOPE LENS SYSTEM
Heinz Dlutzik, New York, N.Y., assignor to Zoomar, Inc., Glen Cove, N.Y., a corporation of New York
Filed Nov. 16, 1959, Ser. No. 853,027
2 Claims. (Cl. 88—57)

This invention relates to telescopes or binoculars and particularly telescopes or binoculars of variable magnification.

Telescopes of variable magnification have been discussed in the prior art and in previous publications. Such devices, however, were chiefly directed toward the structure whereby a more or less stationary image could be produced within the systems, and did not direct themselves toward the problem of correcting the aberrations of such a system to the extent necessary to produce an image comparable in quality to that of a standard telescope or binocular.

It has previously been disclosed that a varifocal system could only be corrected by keeping the different aberrations constant throughout the zoom regardless of their numerical amount and correct the stabilized image defects in a standard rear system. Such correction was possible in prior art devices which were primarily lenses for photography, cinematography and television. The rear system usually reduced the image produced by the varifocal system and thereby improved the image quality even further than that brought about by the correction introduced by the rear (relay) system. However, in the optical system of a telescope it is not possible to achieve the correction previously brought about by the rear system because a telescope is of necessity afocal and therefore, produces an image of indeterminate size. Any reduction that a standard relay system produces would be offset by the magnification of the eye piece if a certain given magnification or (power) of the system is to be maintained.

Accordingly, it is an object of the present invention to provide a telescope or binocular of variable magnification which is optically compensated for image shifts.

Another object of the present invention is to provide a telescope in which the image quality is comparable to that of a standard telescope.

Another object of the present invention is to provide a telescope or binocular in which the distortion of the varifocal front system is very small.

An object of the present invention is to provide a varifocal telescope or binocular having a small overall size.

Still another object of the present invention is to provide a varifocal telescope having a 60° apparent field angle at the eye piece and a large range of magnification the order of 1–4.

A feature of the present invention is its use of an optically compensated varifocal system with stabilized lens aberrations as the objective in the telescopic system.

Another feature in the present invention is the use of a combination of a substantially powerless lens system and Porro prisms as the erector of the varifocal front system.

A further feature of the present invention is its use of a wide angle corrective lens system as of an eye piece.

The invention consists of the construction, combination and arrangement of parts, as herein illustrated, described and claimed.

In the accompanying drawings forming a part hereof, is illustrated one form of embodiment of the invention, and in which:

FIGURE 2 is a view similar to FIGURE 1 with a movable lens element shown at the opposite end of their travel from that of FIGURE 1.

FIGURE 3 is an isometric view of the Porro prisms used in the present device with the path of a light ray shown in dashed lines to indicate its travel therethrough.

Figure 1:
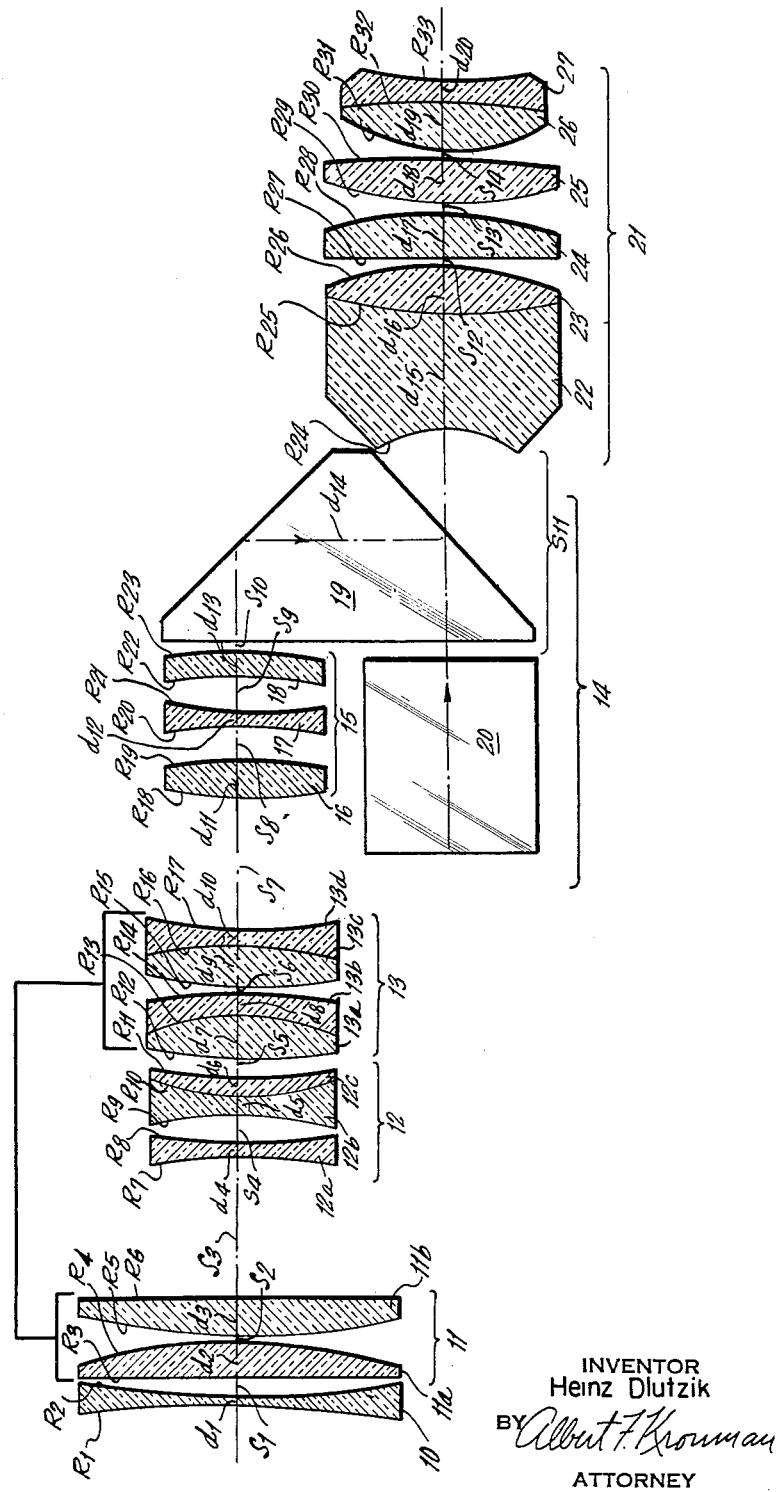
FIGURE 1 is a somewhat diagrammatic longitudinal section taken through a varifocal telescope lens system, a complete embodiment of the present invention.

In the study of the varifocal lens system it has been found that spherical aberrations, coma, astigmatism, field curvature and chromatic defects can be stabilized, but that distortion can generally be reduced only by distributing it in such a way that at one end of the zoom there is a pin cushion distortion and at the other end of the zoom a barrel distortion. Since a modern binocular or telescope has to be provided with a wide angle eye piece (60° apparent angle of field) and since such an eye piece introduces a considerable amount of barrel distortion of its own it has been found that satisfactory performance of a varifocal telescope or binocular can only be achieved by distributing the distortion of the varifocal front system in such a way that, in the middle position the pin cushion distortion is numerically equal to the barrel distortion of the eye piece.

In order to keep the aberrations small the combination of glasses used in the varifocal front system results in a stable but large amount of chromatic aberrations, especially lateral color. This lateral color is so strong that a special type of eye piece is required to compensate for it.

The varifocal lens system herein described consists generally of a single negative front lens 10 which forms a fixed stationary image, a positive movable lens combination 11 which changes the size of the image formed by the front lens, a negative stationary lens combination 12 consisting of a single lens 12a and a cemented doublet 12b, 12c, both of negative power to invert the image formed by components 10 and 11 of the movable lens combination, and a second positive movable component 13 consisting of two cemented doublets 13a, 13b, 13c, 13d, each of positive power. The second movable component keeps the image received from the negative lens combination 12 fixed in space regardless of the position of lens groups 11 and 13. The lens components 10, 11, 12, 13, form the objective of the telescope and is followed by a component erecter system 14 consisting of three lenses 16, 17, 18 (positive, negative, positive, in the direction of the light) and two Porro prisms 19, 20, of standard design. The compound erector again inverts the image. Behind the erector 14 there is a wide angle eye piece 21 which is designed in such a way that it offsets the lateral color produced by the varifocal objective system and which is only partially compensated for by the erector 14. The eye piece collimates and magnifies the image produced by the objective.

It has been found that in order to keep the lens aberrations of the varifocal system stable while at the same time restricting the amount of distortion to a minimum, certain relations between the refractive power of the several surfaces, lenses and lens combinations must be maintained. In the following description the order of the lenses and lens surfaces will be enumerated in the direction of the light paths, that is, in the direction of light coming from the object to the eye.

As used herein the symbol $\Phi$ indicates the power of lenses and lens groups. The symbol $\phi$ stands for surfaces.

The front lens 10 is a bi-concave lens where the ratio of the power $\phi_1$ of the front surface $R_1$ to the power $\phi_2$ of the rear surface $R_2$ is at least .35 but not more than .70 or, $$.35 < \frac{\phi 1}{\phi 2} < .70$$

In the first movable lens group 11 consisting of lenses 11a, 11b, the power $\phi 4 + \phi 5$ of the two inner surfaces $R_4$, $R_5$, adjacent the air gap $S_2$, is substantially stronger than the sum of the powers $\phi 3 + \phi 6$ of the outer surfaces $R_3$, $R_6$, facing the variable air spaces $S_1$, $S_3$, on either side of the movable lens group 11. The sum of the surface powers of said inner surfaces $R_4$, $R_5$, is at least five times but not more than eight times as strong as the sum of the powers of the said outer surfaces, or:

$$5.0 < \frac{\phi 4 + \phi 5}{\phi 3 + \phi 6} < 8.0$$

In the second stationary group consisting of lenses 12a, 12b, 12c, the power $\Phi 12a$ of the first single lens 12a is preferably at least .35 but not more than .70 of the power $\Phi 12$ of the lens group 12, or:

$$.35 \, \Phi 12 < \Phi 12a < .70 \, \Phi 12$$

The cemented doublet 12b, 12c, of the second stationary lens group 12 is of such a shape that the ratio of the power $\phi 9$ of its front surface $R_9$ to the power $\phi 11$, of its rear surface $R_{11}$ is at least .90 but not more than 1.40 or:

$$.90 < \frac{\phi 9}{\phi 11} < 1.40$$

The second movable lens group 13 consists of lenses 13a, 13b, 13c, 13d, and must fulfill the following conditions: The power $\phi 12$ of the front surface $R_{12}$ and the power $\phi 14$ of the rear surface $R_{14}$ of the first doublet 13a, 13b, are both collective and must both have a power $\phi 12$, $\phi 14$, of at least .40 but not more than .70 of the total power $\Phi 13$ of the second movable lens group 13, or:

$$.40 \, \Phi 13 < \phi 12 < .70 \, \Phi 13$$

$$.40 \, \Phi 13 < \phi 14 < .70 \, \Phi 13$$

The second doublet 13c, 13d, which serves mainly for corrective purposes and has very little power of its own has a front surface $R_{15}$ of the power $\phi 15$ which is at least .60 but not more than .95 of the total power $\Phi 13$ of the second movable lens group 13, or:

$$.60 \, \Phi 13 < \phi 15 < .95 \, \Phi 13$$

while the total power $\Phi 13c + \Phi 13d$ of this second doublet 13c, 13d, is at least .16 but not more than .25 of the total power $\Phi 13$ of said second movable lens group 13, or $$.16 \, \Phi 13 < \Phi 13c + \Phi 13d < .25 \, \Phi 13$$

The front system has its aberrations stabilized independent of the zoom position. However, the numerical value of these aberrations is relatively large. In order for the present invention to operate satisfactorily it has been found that a special erecting system is required. In order to prevent the exit pupil from shifting during the zoom the aperture stop of the telescope is not formed by the front lens as is usual, but by the erector system 15. This system generally indicated at 14 in FIGURES 1, 2, employs a specially designed triplet 15, comprising lenses 16, 17, 18, in addition to the Porro prism systems 19, 20. The first lens system 16 of 15 forms the aperture of the telescope so that the exit pupil remains stationary.

In order for the lenses of the said erecting system 14 to reduce the large aberrations sufficiently to achieve an image quality comparable to that of good single magnification telescopes despite its relatively wide magnification range of 1 to 4, the following relations must be maintained:

The absolute value of the ratio of the power $\Phi 16$, of the first lens 16 to the power $\Phi 17$ of the lens 17 should be at least .5 but not more than .85, or:

$$.50 < \left|\frac{\Phi 16}{\Phi 17}\right| < .85$$

The small air gap $S_8$ between lens 16 and 17 is treated as a lens and the absolute ratio of the refractive power $\phi 19$, $\phi 20$, of the adjacent surfaces $R_{19}$, $R_{20}$, of the said air lens has to be .55 but not more than .95 or:

$$.55 < \left|\frac{\phi 19}{\phi 20}\right| < .95$$

The second air gap $S_9$ is similarly treated as a lens and the absolute numerical value of the ratio of the powers $\phi 21$, $\phi 22$ of its adjacent surfaces is at least .9 but not more than 1.5 or:

$$.90 < \left|\frac{\phi 21}{\phi 22}\right| < 1.5$$

The last element 18 of the erector lens system 15 is a meniscus with an absolute power ratio of its two surfaces of at least .60 but not more than .95 or $$.60 < \left|\frac{\phi 22}{\phi 23}\right| < .95$$

The remainder of the erector system 14 consists of two Porro prisms 19, 20, of conventional shape. However, while in the known prism erecting systems a ground glass of low dispersion (high Abbe number) is used, in the present invention a highly dispersive dense flint is used to achieve the necessary color correction.

The eyepiece 21 of the present device consists of a specially constructed wide angle magnifier which, by the use of modern rare earth glasses, combines a wide apparent field angle with just the right amount of aberrations of opposite direction to offset the aberrational residue of the objective lenses. It also provides a low pupil aberration and at the same time sufficient eye relief. Referring to FIGURE 1 it will be noted that the construction of the eyepiece consists in the direction of the light, of a dispersive cemented doublet 22, 23 two collective single lenses 24, 25, and a collective doublet 26 and 27. The power of the several lenses and surfaces within the eyepiece 21 has to be distributed in the following way:

The total power $\Phi 23$ to $\Phi 26$ of all of the components 23, 24, 25, 26, has to be at least 1½ times but not more than 2.3 times the power $\Phi 21$ of the entire eyepiece 21, or:

$$1.5 \, \Phi 21 < \Phi 23 \text{ to } \Phi 26 < 2.3 \, \Phi 21$$

The first surface of the eyepiece 21 mainly determines the position of the exit pupil and thereby the eye relief. The ratio of the radius $r_{25}$ of the second (cemented) surface to the radius $r_{26}$ of the rear surface has to be at least .70 but not more than 1.25 or:

$$.70 < \left|\frac{r_{25}}{r_{26}}\right| < 1.25$$

The air gap $S_{12}$ which forms an air lens has to have a power ratio between its adjacent surfaces of at least .70 but not more than 1.25, or $$.70 < \frac{\phi 28}{\phi 29} < 1.25$$

The radii $r_{31}$, $r_{32}$, of the component 26 of the rear positive doublet 26, 27, have a ratio with the absolute value of at least 3.5 but not more than 5.0 while the negative component 27 of said doublet 26, 27, has an absolute ratio between its front surface radius $r_{32}$ and rear surface radius $r_{33}$ of at least .30 but not more than .60, or $$3.5 < \left|\frac{r_{31}}{r_{32}}\right| < 5.0$$

$$.30 < \left|\frac{r_{32}}{r_{33}}\right| < .60$$

In FIGURE 3 it will be seen that light entering the Porro prism 19 from the varifocal front system is reflected twice from the surfaces of the said prism 19 into the second prism 20 where it is again reflected twice and directed into the eye piece 21. It is also within the purview of the present invention to place the erector prisms 19, 20, in front of the triplet corrective lens system 15 if so desired. Such a construction may serve to shorten the overall length of the lens system.

An example of a lens system of variable magnification for a telescope or binocular according to the present invention is:

Radius, thickness and spacing in millimeters
$BaSF_2$ = barium dense flint
$BaF_5$ = barium flint
$SK_{15}$ = dense crown
$SF_5$ = dense flint
$SK_2$ = dense crown
$SF_8$ = dense flint
$LaK_3$ = lanthanum crown
$SF_{18}$ = dense flint
$SFS_5$ = extra dense flint
$SF_2$ = dense flint
$SK_5$ = dense crown
$LaK_8$ = lanthanum crown
$SF_4$ = dense flint

Having thus fully described the invention, what is claimed as new and desired to be secured by Letters Patent of the United States, is:

1. A lens system for a varifocal binocular comprising in the order of the direction of the incident light, a varifocal objective comprising a front lens of negative power to receive light coming from an object and form a fixed,

| Lens No. | Radius ($r$) (mm.) | Thickness ($d$) and Air Spacing ($s$) | Glass (Cat. Ref.) | Index ($N_D$) | Abbe No. Dispersion ($V$) |
|---|---|---|---|---|---|
| Front System: | | | | | |
| 10 | $r_1 = -262.71$ | $d_1 = 2.00$ | $BaSF_2$ | 1.664 | 35.88 |
|  | $r_2 = +140.22$ | $s_1 = 40.82$ to $2.07$ | | | |
| 11a | $r_3 = +624.99$ | $d_2 = 4.00$ | $BaF_5$ | 1.607 | 49.25 |
|  | $r_4 = -86.52$ | $s_2 = 0.50$ | | | |
| 11b | $r_5 = +88.93$ | $d_3 = 4.00$ | $BaF_5$ | 1.607 | 49.25 |
|  | $r_6 = -469.81$ | $s_3 = 0.87$ to $39.62$ | | | |
| 12a | $r_7 = -102.19$ | $d_4 = 2.00$ | $SK_{15}$ | 1.623 | 58.12 |
|  | $r_8 = +91.36$ | $s_4 = 1.70$ | | | |
| 12b | $r_9 = -78.08$ | $d_5 = 2.00$ | $SK_{15}$ | 1.623 | 58.12 |
| 12c | $r_{10} = +22.68$ | $d_6 = 4.58$ | $SF_5$ | 1.673 | 32.23 |
|  | $r_{11} = +97.71$ | $s_5 = 39.87$ to $1.12$ | | | |
| 13a | $r_{12} = +74.48$ | $d_7 = 6.00$ | $SK_2$ | 1.607 | 56.66 |
|  | $r_{13} = -25.00$ | $d_8 = 2.00$ | $SF_8$ | 1.689 | 31.15 |
| 13b | $r_{14} = -84.13$ | $s_6 = 0.50$ | | | |
| 13c | $r_{15} = +51.90$ | $d_9 = 5.90$ | $LaK_3$ | 1.693 | 53.51 |
|  | $r_{16} = -32.58$ | $d_{10} = 2.00$ | $SF_{18}$ | 1.721 | 29.28 |
| 13d | $r_{17} = +72.06$ | $s_7 = 1.25$ | | | |
| Erector Lenses 15: | | | | | |
| 16 | $r_{18} = +56.70$ | $d_{11} = 4.00$ | $SFS_5$ | 1.762 | 26.98 |
|  | $r_{19} = -91.57$ | $s_8 = 4.00$ | | | |
| 17 | $r_{20} = -52.75$ | $d_{12} = 2.00$ | $SK_5$ | 1.589 | 61.24 |
|  | $r_{21} = +30.89$ | $s_9 = 4.00$ | | | |
| 18 | $r_{22} = -48.48$ | $d_{13} = 3.50$ | $SF_{18}$ | 1.762 | 29.28 |
|  | $r_{23} = -36.43$ | $s_{10} = 2.00$ | | | |
| Erector Prisms 19 and 20. | | $d_{14} = 96.00$ | $SF_2$ | 1.648 | 33.88 |
|  | | $s_{11} = 28.63$ | | | |
| Eye Piece 21: | | | | | |
| 22 | $r_{24} = -13.73$ | $d_{15} = 12.00$ | $SF_2$ | 1.648 | 33.88 |
|  | $r_{25} = +33.45$ | $d_{16} = 8.00$ | $SK_5$ | 1.589 | 61.24 |
| 23 | $r_{26} = -33.45$ | $s_{12} = 0.30$ | | | |
| 24 | $r_{27} = +1,248.00$ | $d_{17} = 6.50$ | $LaK_3$ | 1.713 | 53.89 |
|  | $r_{28} = -40.60$ | $s_{13} = 0.30$ | | | |
| 25 | $r_{29} = +38.18$ | $d_{18} = 6.00$ | $LaK_8$ | 1.713 | 53.89 |
|  | $r_{30} = -244.90$ | $s_{14} = 0.30$ | | | |
| 26 | $r_{31} = +19.59$ | $d_{19} = 7.00$ | $SK_5$ | 1.589 | 61.24 |
| 27 | $r_{32} = -80.00$ | $d_{20} = 2.00$ | $SF_4$ | 1.755 | 27.53 |
|  | $r_{33} = +36.43$ | | | | | stationary image thereof, a first positive lens combination axially slidable with respect to the front lens to change the size of the image formed by the front lens, said positive lens combination comprising a first and second positive lens element coupled together and separated by a fixed air space from each other, an inner surface $R_4$, $R_5$, on each of the first and second positive lens elements facing the fixed air space, a variable air space on each side of the first and second positive lenses opposite the fixed air space, outer surfaces $R_3$, $R_6$, on the positive lenses facing the variable air spaces, said inner surfaces of the first and second positive lens elements facing the fixed air space being at least five times but not more than eight times as strong as the sum of the outer surfaces of said positive lenses to fulfill the condition:

$$5.0 < \frac{\phi 4 + \phi 5}{\phi 3 + \phi 6} < 8.0$$

where $\phi$ is the power of the lens surface, a stationary negative lens combination air spaced from the positive lens combination to invert the image received from said positive lens combination, said stationary lens combination comprising a single negative lens, said single lens having a power $\Phi 12a$ of more than .35 but not more than .70 of the power $\Phi 12$ of the entire lens combination or, $.35|\Phi 12| < |\Phi 12a| < .70|\Phi 12|$ and a negative cemented doublet having a front surface $R_9$ and a rear surface $R_{11}$ such that the ratio of its front surface to its rear surface is at least .90 but not more than 1.40 to fulfill the condition $$.90 < \frac{R9}{R11} < 1.40$$

a second positive lens combination axially slidable with respect to the front lens to receive the image from the stationary lens combination and maintain it substantially stationary in space throughout the movement of the first positive lens combination, said second positive lens combination comprising a first and second cemented doublet of positive power air spaced from each other and coupled together, said first and second doublet having front and rear surfaces $R_{12}$, $R_{14}$, and $R_{15}$, $R_{17}$, respectively, the front and rear surfaces of the first doublet having a power $\phi 12$ or $\phi 14$ respectively of at least .40 but not more than .70 of the total power of the second slidable lens group or $$.40\Phi 13 < \phi 12 < .70\Phi 13$$

$$.40\Phi 13 < \phi 14 < .70\Phi 13$$

and the front surface $R_{15}$, of the second doublet having a power which is at least .60 but not more than .95 of the total power of the second slidable group to fulfill the condition:

$$.60\Phi 13 < \phi 15 < .95\Phi 13$$

and the total power of the second doublet is at least .16 but not more than .25 of the total power of the said second slidable lens combination $13c$, $13d$ to fulfill the condition:

$$.16\Phi 13 < \Phi 13c + \Phi 13d < .25\Phi 13$$

said objective being adapted to substantially stabilize the image defects over the entire range of magnification, a compound erector system to receive the light from the second positive lens combination, correct the stabilized aberrations, and reverse the image, said erector system comprising a first positive erector lens 16, a negative erector lens 17, and a second positive erector lens 18, the absolute value of the ratio of the power of the first positive erector lens to the power of the negative erector lens is at least .50 but not more than .85 or:

$$.50 < \left|\frac{\Phi 16}{\Phi 17}\right| < .85$$

a small fixed air lens $S_8$ between the first positive erector lens and the negative erector lens, surfaces $R_{19}$, $R_{20}$, on the said erector lenses on each side of the air lens, said surfaces having a ratio of absolute refractive power of at least .50 but not more than .95 or:

$$.55 < \left|\frac{\phi 19}{\phi 20}\right| < .95$$

a second air lens $S_9$ between negative erector lens and the second positive erector lens, adjacent surfaces $R_{21}$, $R_{22}$, on the air lens, said surfaces having an absolute power ratio of at least .90 but not more than 1.5 or:

$$.90 < \left|\frac{\phi 21}{\phi 22}\right| < 1.5$$

said second positive erector lens having two surfaces $R_{22}$, $R_{23}$, with an absolute power ratio of at least .60 but not more than .95 or:

$$.60 < \left|\frac{\phi 22}{\phi 23}\right| < .95$$

a first and a second Porro prism, said erector lenses being separated by fixed air spaces, and a wide angle eye piece comprising a dispersive doublet, a first surface $R_{24}$, a second, cemented, surface $R_{25}$ and a rear surface $R_{26}$ on said doublet, the absolute ratio of the second surface $R_{25}$ to the rear surface $R_{26}$ being at least .70 but not more than 1.25 or:

$$.70 < \left|\frac{R_{25}}{R_{26}}\right| < 1.25$$

a first and second lens of collective power, a fixed air gap $S_{13}$ forming an air lens between the first and second lens of collective power, surfaces $R_{28}$, $R_{29}$, on the said first and second collective lens on each side of the air gap $S_{13}$, said surfaces having a power ratio of at least .70 but not more than 1.25 or:

$$.70 < \frac{\phi 28}{\phi 29} < 1.25$$

and a collective doublet having a positive and a negative component, said positive component having a ratio of the radii of its front surface $R_{31}$ to its rear surface $R_{32}$ with the absolute value of at least 3.5 but not more than 5.0 and the negative component of said doublet having an absolute ratio between the radius of, it front surface $R_{32}$ and its rear surface $R_{33}$ of at least .30 but not more than .60 or:

$$3.5 < \left|\frac{R_{31}}{R_{32}}\right| < 5.0$$

$$.30 < \left|\frac{R_{32}}{R_{33}}\right| < .60$$

said eye piece being adapted to receive the image from the erector system and colimate and magnify the said image.

2. A lens system for a varifocal binocular according to claim 1 in which the lens and prism elements conform to the following characteristics wherein, $N_D$ is the refractive index for the D line,
V is the Abbe's dispersion number,
$BaSF_2$ stands for barium dense flint,
$BaF_5$ stands for barium flint,
SK15, SK2, SK5, stand for dense crown
SF5, SF8, SF18, SF2, SF4, stand for dense flint
$SFS_5$ stands for extra dense flint
$LaK_3$, $LaK_8$, stand for lanthanum crown

| Lens No. | Radius (r) (mm.) | Thickness (d) and Air Spacing (s) | Glass (Cat. Ref.) | Index (N°) | Abbe No. Dispersion (V) |
|---|---|---|---|---|---|
| Front Lens 10 | $r_1 = -262.71$ | $d_1 = 2.00$ | $BaSF_2$ | 1.664 | 35.88 |
|  | $r_2 = +140.22$ | $s_1 = 40.82$ to 2.07 |  |  |  |
| Variator: |  |  |  |  |  |
| 11a | $r_3 = +624.99$ | $d_2 = 4.00$ | $BaF_5$ | 1.607 | 49.25 |
|  | $r_4 = -86.52$ | $s_2 = 0.50$ |  |  |  |
| 11b | $r_5 = +88.93$ | $d_3 = 4.00$ | $BaF_5$ | 1.607 | 49.25 |
|  | $r_6 = -469.81$ | $s_3 = 0.87$ to 39.62 |  |  |  |
| Erector: |  |  |  |  |  |
| 12a | $r_7 = -102.19$ | $d_4 = 2.00$ | $SK_{15}$ | 1.623 | 58.12 |
|  | $r_8 = +91.36$ | $s_4 = 1.70$ |  |  |  |
| 12b | $r_9 = -78.08$ | $d_5 = 2.00$ | $SK_{15}$ | 1.623 | 58.12 |
| 12c | $r_{10} = +22.68$ | $d_6 = 4.58$ | $SF_5$ | 1.673 | 32.23 |
|  | $r_{11} = +97.71$ | $s_5 = 39.87$ to 1.12 |  |  |  |
| Compensator: |  |  |  |  |  |
| 13a | $r_{12} = +74.48$ | $d_7 = 6.00$ | $SK_2$ | 1.607 | 56.66 |
| 13b | $r_{13} = -25.00$ | $d_8 = 2.00$ | $SF_8$ | 1.689 | 31.15 |
|  | $r_{14} = -84.13$ | $s_6 = 0.50$ |  |  |  |
| 13c | $r_{15} = +51.90$ | $d_9 = 5.90$ | $LaK_3$ | 1.693 | 53.51 |
|  | $r_{16} = -32.58$ |  |  |  |  |
| 13d | $r_{17} = +72.06$ | $d_{10} = 2.00$ | $SF_{18}$ | 1.721 | 29.28 |
|  |  | $s_7 = 1.25$ |  |  |  |
| Relay: |  |  |  |  |  |
| 16 | $r_{18} = +53.70$ | $d_{11} = 4.00$ | $SFS_5$ | 1.762 | 26.98 |
|  | $r_{19} = -91.57$ | $s_8 = 4.00$ |  |  |  |
| 17 | $r_{20} = -52.75$ | $d_{12} = 2.00$ | $SK_5$ |  |  |
|  | $r_{21} = +30.89$ | $s_9 = 4.00$ |  |  |  |
| 18 | $r_{22} = -48.48$ | $d_{13} = 3.50$ | $SF_{18}$ | 1.762 | 29.28 |
|  | $r_{23} = -36.43$ | $s_{10} = 2.00$ |  |  |  |
| Erector Prisms |  | $d_{14} = 96.00$ | $SF_2$ | 1.648 | 33.88 |
|  |  | $s_{11} = 28.63$ |  |  |  |
| Eye Piece: |  |  |  |  |  |
| 22 | $r_{24} = -13.73$ | $d_{15} = 12.00$ | $SF_2$ | 1.648 | 33.88 |
| 23 | $r_{25} = +33.45$ | $d_{16} = 8.00$ | $SK_5$ | 1.589 | 61.24 |
|  | $r_{26} = -33.45$ | $s_{12} = 0.30$ |  |  |  |
| 24 | $r_{27} = +1,248.00$ | $d_{17} = 6.50$ | $LaK_8$ | 1.713 | 53.89 |
|  | $r_{28} = -40.60$ | $s_{13} = 0.30$ |  |  |  |
| 25 | $r_{29} = +38.18$ | $d_{18} = 6.00$ | $LaK_8$ | 1.713 | 53.89 |
|  | $r_{30} = -244.90$ | $s_{14} = 0.30$ |  |  |  |
| 26 | $r_{31} = +19.59$ | $d_{19} = 7.00$ | $SK_5$ | 1.589 | 61.24 |
| 27 | $r_{32} = -80.00$ | $d_{20} = 2.00$ | $SF_4$ | 1.755 | 27.53 |
|  | $r_{33} = +36.43$ |  |  |  |  |

References Cited in the file of this patent
UNITED STATES PATENTS

| | | |
|---|---|---|
| 2,549,158 | Bertele | Apr. 17, 1951 |
| 2,765,718 | Beecher | Oct. 9, 1956 |
| 2,843,016 | Reiss | July 15, 1958 |
| 2,846,922 | Kohler | Aug. 12, 1958 |
| 2,913,957 | Back | Nov. 24, 1959 |
| 2,924,146 | Back | Feb. 9, 1960 |
| 2,925,010 | Turula et al. | Feb. 16, 1960 |
| 2,942,519 | Boughton et al. | June 28, 1960 |